US008066048B2

(12) United States Patent
Leykamm

(10) Patent No.: US 8,066,048 B2
(45) Date of Patent: Nov. 29, 2011

(54) DEVICE AND METHOD FOR APPLYING LABELS

(75) Inventor: Dieter Leykamm, Neutraubling (DE)

(73) Assignee: Krones AG, Neutraubling (DE)

( * ) Notice: Subject to any disclaimer, the term of this patent is extended or adjusted under 35 U.S.C. 154(b) by 257 days.

(21) Appl. No.: 12/338,243

(22) Filed: Dec. 18, 2008

(65) Prior Publication Data

US 2009/0159193 A1 Jun. 25, 2009

(30) Foreign Application Priority Data

Dec. 20, 2007 (DE) ......................... 10 2007 062 471

(51) Int. Cl.
*B65C 9/10* (2006.01)
*B65G 59/00* (2006.01)
*B65H 1/00* (2006.01)

(52) U.S. Cl. ........ 156/570; 156/557; 221/104; 221/106; 221/112; 271/157; 271/9.01

(58) Field of Classification Search .................. 156/570, 156/564, 568, 571, DIG. 29, 577; 221/104, 221/106, 112; 271/157, 9.01
See application file for complete search history.

(56) References Cited

U.S. PATENT DOCUMENTS

| | | | | |
|---|---|---|---|---|
| 4,639,206 | A * | 1/1987 | Darr | 425/503 |
| 5,569,353 | A * | 10/1996 | Zodrow | 156/566 |

FOREIGN PATENT DOCUMENTS

| | | | |
|---|---|---|---|
| CA | 2391556 | A1 | 12/2003 |
| DE | 2153169 | | 5/1973 |
| DE | 2303547 | | 8/1974 |
| DE | 3002250 | | 7/1981 |
| DE | 2202525 | | 1/1984 |
| DE | 3525035 | | 1/1987 |
| DE | 8502925 | | 4/1989 |
| DE | 29701581 | | 8/1997 |
| DE | 102007018127 | | 12/2004 |
| DE | 60202649 | | 1/2006 |
| EP | 1097872 | | 5/2001 |
| EP | 1314648 | | 5/2003 |
| EP | 1652774 | | 5/2006 |
| JP | 02004466 | | 1/1990 |
| JP | 03056226 | | 3/1991 |
| JP | 06016214 | | 3/1994 |
| JP | 06285687 | A | 10/1994 |

OTHER PUBLICATIONS

European Search Report for EP 08021766 mailed Apr. 6, 2009.
German Search Report for DE 10 2007 062 471.0 dated Jul. 16, 2008.
Office Action for Japanese Application No. P2008-318611 dated Jun. 14, 2011.

* cited by examiner

*Primary Examiner* — Linda L Gray
(74) *Attorney, Agent, or Firm* — Marshall, Gerstein & Borun LLP

(57) ABSTRACT

A device for applying labels to a label carrier including a movable rack, which defines a plurality of magazine sites, each of the magazine sites being configured for accommodating a label magazine that is suitable for accommodating a large number of labels. The magazine rack further includes docking means with the aid of which the rack can be docked to a labeling unit prepared for applying the individual labels from a selected label magazine to the label carrier. The device further includes a supply unit through which a selected label magazine can be transferred from the magazine site within the rack to an operating position at which the labels are taken hold of by the labeling unit and applied individually to one of the label carriers.

7 Claims, 1 Drawing Sheet

DEVICE AND METHOD FOR APPLYING LABELS

CROSS-REFERENCE TO RELATED APPLICATION

The present application claims the benefit of priority of German Patent Application No. 102007062471.0, filed Dec. 20, 2007. The entire text of the priority application is incorporated herein by reference in its entirety.

FIELD OF THE DISCLOSURE

The present disclosure relates to a device and a method for applying labels to a label carrier, including for applying labels to bottles as label carriers.

BACKGROUND

The prior art describes various devices and procedures for applying labels to a bottle, cf. e.g. DE 30 02 250, DE 2 202 525 and DE 2 303 547, which is owned by the applicant.

When labels are applied to label carriers, such as food packages, in this case especially beverage bottles, the problem arises that the process has to be executed as a continuous process, whereas the labels to be applied are normally produced and prepared in the area of a print shop and are then transported in packed units from this label production area to a label application area which is normally located in the bottling or bagging area of a food packaging firm, and in particular in the bottling area of a bottling firm. Here, the labels combined in the respective packed units are removed from said packed units and inserted in a magazine. This magazine is supplied to the labelling unit which removes the labels one by one directly from the magazine or from a removal site which is fed by the label magazine.

EP 1 097 872, for example, discloses a device for applying labels in the case of which the label magazine consists of a label drum defining on the outer circumferential surface thereof a plurality of axially extending label accommodation means. This label magazine rotates relative to a label removal site. Respective individual label accommodation means are in alignment with the label removal site which is fed by one of the label accommodation means of the label magazine arranged in alignment with the label removal site in the axial direction. The label removal site comprises a temporary storage unit which is able to store a certain number of labels so that the labelling process need not be interrupted when the label magazine is exchanged.

According to the method known from DE 2 202 525, labels in transport containers are supplied by the manufacturer. The operators of the machine attach the individual transport containers to a transfer station where the content of the transport containers is transferred to a temporary storage unit of the labelling unit from where the labels are transferred one by one to the label carrier where they are fixed in position. It is true that, in the case of this known prior art, the complicated process of unpacking the packed units of labels and stacking the labels in the label accommodation means of the label magazine is no longer necessary, but the provision of the labels at the labelling unit nevertheless necessitates a substantial amount of manual activities which, taking into account the almost complete automation of the packaging and labelling process, is to be avoided.

SUMMARY OF THE DISCLOSURE

One aspect of the present disclosure is to provide a device for applying labels to a label carrier which allows an increased degree of automation in comparison with the prior art. Another aspect of the present disclosure is to provide a suitable method for applying labels.

As regards the solution of the problem arising in connection with such devices, the present disclosure provides a device used for applying labels to a label carrier and includes a movable rack which defines a plurality of magazine sites, each of the magazine sites being configured for accommodating a label magazine that is suitable for accommodating a large number of labels. Hence, the rack is a store for a large number of label magazines, the label magazines being stored at predetermined locations within the rack. According to the present disclosure, this rack is a movable rack supported on rollers or wheels, which can be drivable and/or steerable, so as to move the rack after the fashion of a carriage or a trailer. The rack further includes docking means with the aid of which the rack can be docked directly or indirectly to a labelling unit prepared for applying the labels one by one to the label carrier. To this end, the labelling unit can include a temporary storage unit which, in the case of an exchange of individual label magazines or of the movable rack in its entirety, provides a sufficient buffer of labels so that the labelling process can be continued undisturbed during the exchange operation. The above-mentioned docking means of the rack which normally cooperates with a docking countermeans on the side of the labelling unit, is in particular a mechanical docking means which, in the docked position, positions and/or fixes the movable rack in a predetermined manner relative to the labelling unit.

Other than the known prior art, the present disclosure does not manually supply individual charged label magazines to the labelling unit. What is, however, supplied to the labelling unit is a movable rack with a plurality of label magazines held on the magazine sites so that, by successively accessing the respective magazine sites, the labelling unit will be able to work automatically without manual intervention on the part of the machine operators for a long period of time. In the device according to the present disclosure the labels from a selected label magazine are applied to the label carrier. For this purpose, a supply unit is normally realized as part of the labelling device. The supply unit is, however, normally implemented such that it can be used for transferring a selected label magazine from the magazine site within the rack to an operating position at which the labels are seized by the labelling unit and applied individually to one of the label carriers. To this end, it is not necessary to remove the labels one by one from the label magazine, but the labels can first be transferred en bloc from the label magazine into said temporary storage unit from where they can be applied one by one to the respective label carrier by means of the labelling unit.

The above-mentioned supply unit can be implemented in various ways. The supply unit can, for example, be associated with the rack. The rack is preferably provided with signal and/or drive interfaces which can be coupled to signal and/or drive counterinterfaces on the side of the labelling unit, when the rack is docked to said labelling unit. In other words, the control signals emitted by the labelling unit can be transferred from the labelling unit to the rack via the signal interface and mechanical or electrical energy can be transferred from the labelling unit to the rack via the drive interface. Hence, the rack can have a comparatively simple and mobile structural design. A data input and/or a data memory for controlling the supply unit possibly through a central controller can be dispensed with according to this preferred embodiment. As has already been mentioned, also the drive interface can directly input mechanical energy in the movable rack and, consequently, the drive interface can consist of a shaft coupling or the like; a realization of drives for operating the supply unit on the side of the rack is therefore not necessary. Hence, the rack can be implemented such that it is comparatively light and mobile.

According to a preferred further development of the present disclosure, the signal and/or drive interface on the side of the rack and the signal and/or drive counterinterfaces on the side of the labelling unit are configured and arranged such that, when the rack is docked to said labelling unit, a signal and/or drive connection between said labelling unit and the rack is inevitably established via the interfaces. In other words, the respective interfaces are arranged such that, when the labelling unit and the rack are e.g. mechanically coupled for docking the rack to the labelling unit, the interface coupling elements on either side are inevitably brought into engagement with one another so as to exchange electrical and/or mechanical energy or control signals between these two parts of the labelling device.

According to another embodiment, which represents an alternative further development of the supply unit, said supply unit is associated with the labelling unit and preferably arranged between the rack and the labelling unit. The supply unit additionally comprises a handling means with at least one handling element with the aid of which a selected label magazine can be transferred from the magazine site within the rack to the operating position. This further development offers the possibility of providing the rack with a rather simple structural design and of providing the supply unit as a separate machine part between the movable rack and the labelling unit as well as of possibly leaving it there when the movable rack in its entirety is charged.

With due regard to an optimum weight reduction on the part of the movable rack, a further preferred embodiment of the present disclosure suggests that the handling means should be associated with the labelling unit, i.e. it should be fixedly or releasably connected to the labelling unit; the handling means should, in any case, be provided such that, under normal circumstances, it will be stationary relative to the labelling unit. Hence, the handling means preferably defines docking countermeans for establishing an indirect mechanical connection between the docking means of the rack and the labelling unit. According to this preferred embodiment, the movable rack can have a comparatively simple structural design after the fashion of a trolley table. Attention should, however, be paid to the fact that the magazine sites have to be formed at predetermined locations within the movable rack so that the individual label magazines arranged at the respective magazine sites can be seized and supplied to the work station on the basis of this predetermined position.

For reducing the installation and, consequently, the investment costs, a further preferred embodiment of the present disclosure suggests that the rack should have a central passage which is delimited on both sides by superimposed and/or juxtaposed magazine sites. According to this preferred embodiment, the handling means comprises at least one handling element which can be inserted into said passage so that a selected label magazine can be seized at the associated magazine site within the rack and transferred to the operating position by means of said handling element. According to this preferred embodiment, the movable rack is a passive rack which—with the exception of possibly provided drives for moving the rack—does not have any driven parts of its own.

According to a further preferred embodiment of the present disclosure, a transfer station is arranged between the rack and the labelling unit. This transfer station is normally associated with the labelling unit and, according to a specially preferred embodiment, it is fixed to said labelling unit. The transfer station includes a work station which defines the work site at which the labels are transferred to the labelling unit. In addition, the transfer station includes at least one transfer site. This transfer site is occupied by a label magazine during an exchange of magazines. A transfer site can, for example, be provided for holding ready a label magazine filled with labels which, during an exchange of magazines, will be used for replacing the label magazine which is just being emptied. Another transfer site can take up this last-mentioned label magazine, when said magazine is removed from the work station during a magazine exchange operation. The transfer sites can preferably be reached through the supply unit. Also the exchange of label magazines in the area of the transfer station can be effected by the respective supply unit. The transfer station may, however, also be provided with separate drive means so as to cause the exchange and/or the supply of the new full label magazine to the labelling unit. With regard to a fast exchange the respective transfer sites should preferably be provided directly adjacent the work site and especially on the same level so that the label magazines have to be displaced in only one plane for executing an exchange of magazines.

As regards the solution of the problem arising in connection with a method of the type in question, the present disclosure provides a method of applying labels to a label carrier, in particular a bottle, comprising the steps of printing and punching the labels in a label production area and depositing them immediately afterwards in a label magazine. This label magazine is configured for accommodating therein a large number of labels. The thus filled label magazine is then transferred from the label production area to a label application area where the labels are removed from the label magazine and applied one by one to the label carrier. According to the method disclosed by the present disclosure, a plurality of full label magazines is transferred simultaneously and in a predetermined arrangement relative to one another from said label production area to a label application area. The label production area normally consists of a print shop where the labels are printed and punched. The labels produced in this label production area are, however, immediately deposited in label magazines which will then be used in the area of the labelling unit. A time-consuming step of unpacking a packed unit comprising a large number of labels is no longer necessary.

The transfer of a plurality of label magazines to the label application area, where the labels are applied one by one to the label carrier, is carried out in a predetermined arrangement of the plurality of label magazines relative to one another. This arrangement can be accomplished in that a respective label magazine is provided at a predetermined magazine site within a movable rack for temporarily storing the label magazines. With regard to said predetermined order it is, however, particularly important that the individual label magazines should be provided relative to one another in such a way that, for removing labels from a respective single label magazine, said label magazine can be seized and transferred to the work station without being hindered by other label magazines which are simultaneously fed to the label application area.

BRIEF DESCRIPTION OF THE DRAWINGS

Further details and advantages of the present disclosure can be gathered from the following description of an embodiment in combination with the drawing, in which.

DETAILED DESCRIPTION OF THE PREFERRED EMBODIMENT

Figure 1:
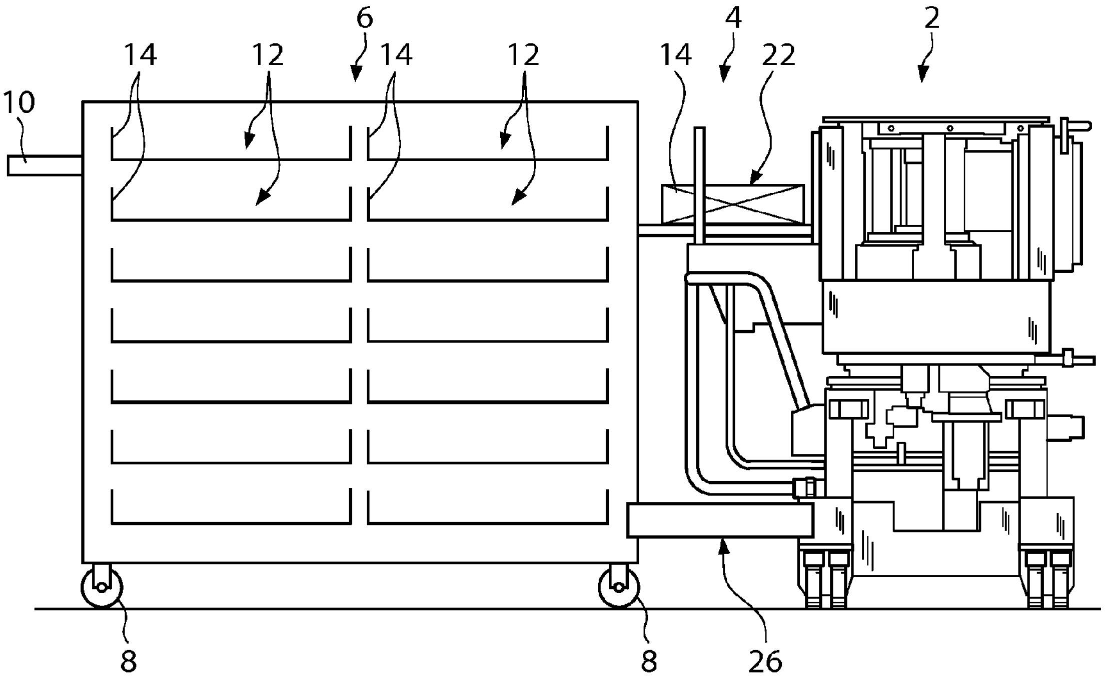
FIG. 1 shows a side view of the embodiment.
Figure 2:
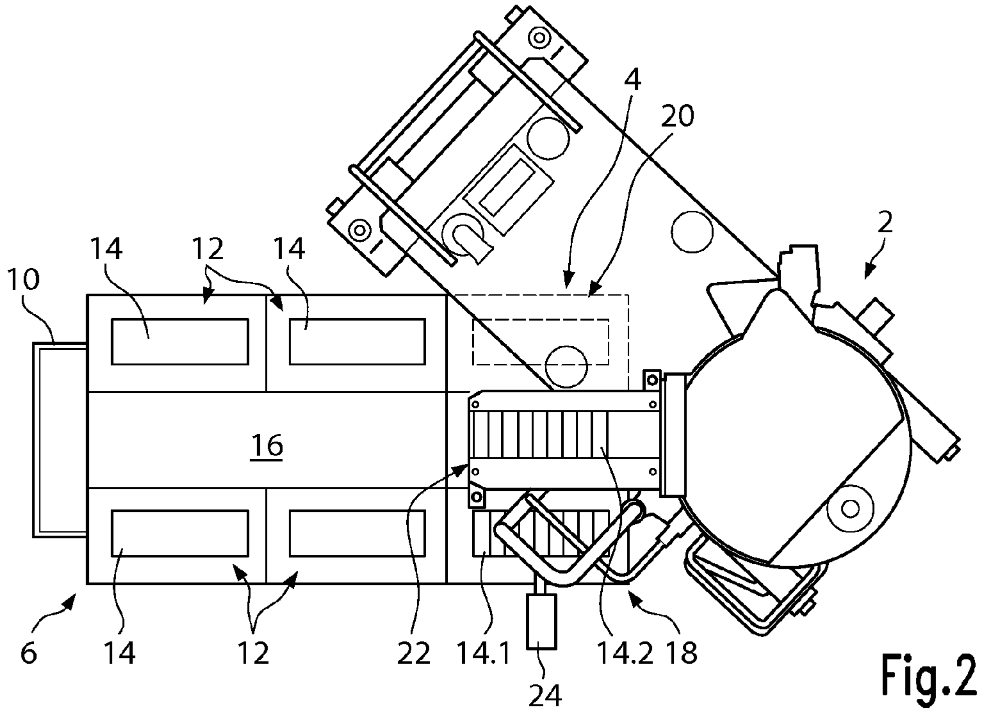
FIG. 2 shows a top view of the embodiment.

FIGS. 1 and 2 show an embodiment of a labelling device. The illustrated embodiment represents part of a bottling and labelling plant in which the bottles to be treated are moved past various work stations in an upright position. One of these work stations, viz. the labelling station, is illustrated in its operating condition in FIGS. 1 and 2. The upright bottles are supplied to the labelling station through suitable conveyors.

The labelling station consists of a labelling unit 2 which is separately mounted on a movable rack so that the labelling unit 2 can be removed from the bottle conveyor when cleaning or maintenance work has to be done. The details of the labelling unit 2 will not be discussed. The labelling unit 2 can be a labelling unit which is known from the prior art.

Directly adjacent to the labelling unit 2, a transfer station 4 is provided, which is releasably connected to the labelling unit 2. A rack 6 is located on the transfer station side facing away from the labelling unit 2, said rack 6 being movable with the aid of rollers 8 and being equipped with a handle 10 after the fashion of a trolley table so that the movable rack 6 can be handled. The rack 6 defines a plurality of magazine sites 12 and a label magazine 14 is provided at each of these magazine sites 12. The rack 6 defines a total of four superimposed rows which each comprise six label magazines 14. In the longitudinal direction of the rack 6, two rows of successive label magazines 14 are provided. Between these two rows a free passage 16 extends which opens towards the transfer station 4.

The transfer station 4 has approximately the same width as the rack 6 and defines respective transfer sites 18, 20 arranged in alignment with the two rows of successive label magazines 14. The transfer station 4 defines a work site 22 between the transfer sites and at the front end face of the passage 16. At this work site 22 a selected label magazine 14.2 occupies its operating position at which labels are removed from the respective label magazine 14.2. Additional label magazines 14.1 and 14.2 are provided on the same level as said label magazine 14.2 which occupies its operating position. The first-mentioned label magazine 14.1 is a magazine which is completely filled with labels and which is located at the transfer site 18 so that it can be exchanged for the label magazine 14.2 occupying its operating position, when all the labels have been removed from this label magazine 14.2.

In the embodiment shown, the movable rack is adapted to be docked on the transfer station 4. To this end, e.g. positive locking means 26 and/or quick release fasteners are provided between the rack 6 and the transfer station 4; with the aid of said positive locking means 26 and/or quick release fasteners the rack 6 can be spatially fixed at the position shown in the drawing relative to the labelling unit 2. In addition, there can be provided interfaces for mechanical and/or electrical energy, which are not shown, as well as possible signal lines so as to transmit control signals from the labelling unit 2 to the rack 6 or vice versa.

When the device shown in FIGS. 1 and 2 is in operation, a drive unit, which is not described in detail, is used for successively removing the individual label magazines 14 from their respective magazine sites 12 in the rack 6 and for moving them via the transfer site 18 to the work site 22; when the respective label magazines have been emptied, they are moved to the transfer site 20 from where they are finally returned to an arbitrary free magazine site 12. The use of troughs having a U-shaped cross-section as label magazines proved to be expedient; the singulated labels stand upright in said troughs where they are enclosed on three sides of their circumference in any case. On the side facing away from the discharge opening, these troughs can have a recess for a slide which is provided on the transfer station 4, e.g. in the form of a driven slide. The transfer station 4 can additionally comprise electric or pneumatic drives for exchanging the emptied label magazine 14. This is exemplarily shown in FIG. 2 in the form of a drive 24, which is formed by a pneumatic cylinder and which, for a change of labels, pushes the label magazine 14.1 to the work site 22 and the label magazine 14.2 occupying said work site 22 to the transfer site 20.

When all the full label magazines 14 have been removed from the rack 6 and emptied at the work site 22, the movable rack 6 in its entirety is displaced and replaced by a rack whose label magazines are charged with labels. Hence, the labelling process executed at the labelling unit 2 will not be interrupted. The rack 6 carrying the empty label magazines is transported to a label production area, e.g. a production site of a print shop, which can be located remote from the bottling plant. There, the individual label magazines 14 are removed from the rack 6 and directly charged with labels provided by the print shop production. To this end, the label magazines can have mechanical interfaces through which the individual magazines can be mechanically connected to the last label production processing station so as to deposit the individual labels one at a time and automatically in the label magazine 14. When all the label magazines have been filled with labels in this way, the individual label magazines 14 are deposited at the respective magazine sites 12. The movable rack 6, which is completely charged with full label magazines 14, is then returned to the bottling plant.

There, the movable rack 6 is manually moved to the transfer station 4 and connected thereto. This small number of manual operations will provide a substantial stock of labels for identifying bottles in the bottling plant.

The invention claimed is:

1. A device for applying labels to a label carrier comprising a movable rack which defines a plurality of magazine sites, each of the magazine sites being configured for accommodating a label magazine that is suitable for accommodating a number of labels, and which includes docking means with the aid of which the rack can be docked to a labelling unit prepared for applying the individual labels from a selected label magazine to the label carrier, and a supply unit through which a selected label magazine can be transferred from the magazine site within the rack to an operating position at which the labels are taken hold of by the labelling unit and applied individually to one of the label carriers, wherein the supply unit is arranged between the rack and the labelling unit and comprises a handling means with at least one handling element with the aid of which a selected label magazine can be transferred from the magazine site within the rack to the operating position, and wherein the handling means is associated with the labelling unit and defines docking countermeans through which the docking means of the rack can be mechanically connected to the labelling unit.

2. A device according to claim 1, wherein the supply unit is associated with the rack and that the rack is provided with one of a signal interface, a drive interface, or a combination thereof, wherein the side of the labelling unit is provided with one of a signal counterinterface, a drive counterinterface, or a combination thereof, and the signal and/or drive interface can be coupled to the signal and/or drive counterinterfaces on the side of the labelling unit, when the rack is docked to said labelling unit.

3. A device according to claim 2, wherein the signal and/or drive interfaces on the rack and the signal and/or drive counterinterfaces on the side of the labelling unit are configured and arranged such that, when the rack is docked to said labelling unit, a signal and/or drive connection between said labelling unit and the rack connected thereto is inevitably established via the interfaces.

4. A device for applying labels to a label carrier comprising a movable rack which defines a plurality of magazine sites, each of the magazine sites being configured for accommodating a label magazine that is suitable for accommodating a number of labels, and which includes docking means with the aid of which the rack can be docked to a labelling unit prepared for applying the individual labels from a selected label magazine to the label carrier, and a supply unit through which a selected label magazine can be transferred from the magazine site within the rack to an operating position at which the labels are taken hold of by the labelling unit and applied individually to one of the label carriers, wherein the rack has a central passage which is delimited on both sides by one of superimposed, juxtaposed, or a combination of superimposed and juxtaposed magazine sites, and a handling means comprising at least one handling element which can be inserted into the passage and with the aid of which a selected label magazine can be transferred from the magazine site within the rack to the operating position.

5. A device for applying labels to a label carrier comprising a movable rack which defines a plurality of magazine sites, each of the magazine sites being configured for accommodating a label magazine that is suitable for accommodating a number of labels, and which includes docking means with the aid of which the rack can be docked to a labelling unit prepared for applying the individual labels from a selected label magazine to the label carrier, and a supply unit through which a selected label magazine can be transferred from the magazine site within the rack to an operating position at which the labels are taken hold of by the labelling unit and applied individually to one of the label carriers, wherein there is provided a transfer station arranged between the rack and the labelling unit and defining a work site, which predetermines the operating position, and at least one transfer site is provided directly adjacent the work site and occupied by a label magazine which is to be transferred to the work site, and a label magazine which comes from the work site when an emptied label magazine is to be replaced by a full label magazine.

6. A device according to claim 5, wherein the work site is provided between two transfer sites which are provided approximately on the same level as said work site.

7. A device according to claim 1, wherein the label carrier is a bottle.

* * * * *